(12) United States Patent
Steinberg (10) Patent No.: US 6,587,949 B1
(45) Date of Patent: *Jul. 1, 2003

(54) SECURE STORAGE DEVICE FOR TRANSFER OF DATA VIA REMOVABLE STORAGE

(75) Inventor: Eran Steinberg, San Francisco, CA (US)

(73) Assignee: Fotonation Holdings, LLC, San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,219

(22) Filed: Jun. 17, 1999

Related U.S. Application Data (63) Continuation-in-part of application No. 09/105,593, filed on Jun. 26, 1998.

(51) Int. Cl.[7] .......................... G06F 11/30; G06F 12/14; H04L 9/32; H04L 17/02

(52) U.S. Cl. ........................................ 713/193; 380/52

(58) Field of Search ..................... 380/54, 52; 713/176, 713/178, 179, 193, 192

(56) References Cited

U.S. PATENT DOCUMENTS

| | | | |
|---|---|---|---|
| 5,027,401 A | | 6/1991 | Soltesz ......................... 380/54 |
| 5,150,407 A | * | 9/1992 | Chan .......................... 713/178 |
| 5,325,430 A | | 6/1994 | Smyth et al. .................. 380/25 |

(List continued on next page.)

OTHER PUBLICATIONS

Anonymous. FlashPath SmartMedia Card Floppy Disk Adapter. Product Description. PC Mall. Internet publication. URL: <http://www.pcmall.com/pcmall/shop/detail.asp?d-pno=210863>.*

Primary Examiner—Gail Hayes
Assistant Examiner—Anthony Di Lorenzo
(74) Attorney, Agent, or Firm—Sawyer Law Group LLP (57) ABSTRACT

A secure storage device with the identical external dimensions, form factor and hardware connectivity configuration of a standard removable storage device, for securing digital data such as digital images from digital cameras at the acquisition stage. Original digital camera data is saved in the memory of the secure storage device after performing one or more security functions, including encryption, creation of an authentication file, adding data to the image data such as fingerprinting, and adding secure annotations such as separate data included in an image header. These processes are transparent to a host device receiving secure data from the storage device because standard protocol is used to write to the secure storage device. The device prepares original authentication data from original digital camera data, and encrypts and stores both the original authentication data and the original image data. The use of the device includes reading the original image data on a separate computer, by means of direct downloading of the data and or mounting the removable storage device on the computer. The computer is able to read data on the raw transfer level as if the device is a standard unsecured storage device. On the content level, the data remains secure. The computer can be programmed with software whereby the encrypted original authentication data can be decrypted by a user having a password key. Additional software may enable the computer to verify the authentication data of the image data for questionable authenticity. The secure storage device secures data from any computerized device that stores data on a removable storage device, such as a portable computer.

12 Claims, 9 Drawing Sheets

U.S. PATENT DOCUMENTS

| | | |
|---|---|---|
| 5,428,685 A | 6/1995 | Kadooka et al. ............... 380/25 |
| 5,442,704 A | 8/1995 | Holtey ......................... 380/23 |
| 5,442,706 A | 8/1995 | Kung ........................... 380/30 |
| 5,467,396 A | 11/1995 | Schossow et al. .............. 380/4 |
| 5,499,294 A * | 3/1996 | Friedman .................... 713/736 |
| 5,581,613 A | 12/1996 | Nagashima et al. ........... 380/21 |
| 5,623,637 A | 4/1997 | Jones et al. ................. 395/491 |
| 5,642,401 A | 6/1997 | Yahagi ......................... 379/58 |
| 5,666,516 A | 9/1997 | Combs ........................ 711/163 |
| 5,668,876 A | 9/1997 | Falk et al. ..................... 380/25 |
| 5,677,953 A | 10/1997 | Dolphin ......................... 380/4 |
| 5,689,563 A | 11/1997 | Brown et al. .................. 380/23 |
| 5,748,744 A * | 5/1998 | Levy et al. .................... 380/52 |
| 5,751,809 A | 5/1998 | Davis et al. ................... 380/4 |
| 5,862,217 A * | 1/1999 | Steinberg et al. ............ 713/176 |
| 5,898,779 A | 4/1999 | Squilla et al. ................ 380/23 |

\* cited by examiner

SECURE STORAGE DEVICE FOR TRANSFER OF DATA VIA REMOVABLE STORAGE

This application is a continuation-in-part of U.S. patent application Ser. No. 09/105,593 filed Jun. 26, 1998.

BACKGROUND OF THE INVENTION

1. Field of the Invention

The present invention-relates generally to digital still the transfer and secure storage of data from a and more particularly to an apparatus for transparently providing embedded security of data within a storage device and of securing data while being transferred from one computerized device to another.

2. Brief Description of the Prior Art

In many applications, digital data needs to be guarded or i.e. secured against unauthorized viewing, modification or distribution. In the specific case of photography negatives positives and prints can be manipulated with some effort, and need protection when used to accurately document images. In such a case, the original negatives and prints are typically kept in locked facilities, with signed, sealed and witnessed chains of custody. The advent of digital cameras presents even greater security challenges. The concept of an original digital image is questionable, because digital data can be perfectly replicated. In addition, digital image data can be quickly and easily modified in a computer, rendering the data useless for evidentiary purposes. Currently, digital camera image data is downloaded either directly to a computer from a camera via some communication mechanism, or through a removable storage device, such as a PCMCIA card, etc. Upon downloading the data to a computer, the image data can be encrypted, or authentication data can be created to prevent an unauthorized person from modifying the data. From this point on, a witnessed chain of custody of those persons with access to the decryption key can be maintained, greatly easing the security problem.

From the above description of the prior art, it is apparent that there is a need for a method and apparatus for securing camera data automatically prior to, or as part of downloading image data from a camera. Such a method and apparatus would greatly improve the security of digital camera data.

SUMMARY OF THE INVENTION

It is therefore an object of the present invention to provide a method and apparatus for securing data on a removable storage device of transferring the.

It is a further object of the present invention to provide a secure storage device for digitally saving data from a digital camera.

It is a further object of the present invention to provide a method and apparatus for securing data from still and video cameras during the process of transferring data from a camera to a computer, wherein the securing process is undetected by or i.e. transparent to the camera, and therefore providing a method and apparatus that can be used with any digital camera.

It is a further object of the present invention to provide a secure storage and/or communication device that automatically encrypts loaded digital camera data.

It is another object of the present invention to provide an apparatus with dimensions and connectors in the form of a PCMCIA card that is accepted by a digital camera and a destination computer as a standard PCMCIA card, while performing the function of automatically securing loaded digital camera data.

It is a still further object of the present invention to provide a secure storage and/or communication device that can be programmed with a security key, that automatically stores loaded original digital camera data, and prepares encrypted authentication data.

It is another object of the present invention to provide a secure storage and/or communication device that inserts information into loaded digital camera image data, i.e. performs fingerprinting.

It is a further object of the present invention to provide a secure storage and/or communication device that includes additional information along with the image data, i.e., provides annotations, such as the absolute time of acquisition, a unique and continuous image counter, and a unique image and device identification number 15

It is a further object of the present invention to provide a transparent mechanism wherein portions of files may be secured while other portions remain unsecured.

Briefly, a preferred embodiment of the present invention includes a secure storage device with the external dimensions of a removable storage card such as a PCMCIA card, Compact Flash Card, Smart Memory Card, Memory Stick Card, Click Drive, etc. for securing a data at the acquisition stage. In a specific case the data is originated from a digital still or video camera. Original digital camera data is saved in the memory of the secure storage device which has the capability of performing one or more security functions, including encryption, creation of an authentication file, adding data to the image data such as fingerprinting, and adding secure annotations such as separate data included in an image header. The device prepares original authentication data from original digital camera data, and encrypts and stores both the original authentication data and the original image data. The use of the device includes downloading the original image data to a first computer, and encrypted original authentication data to a second computer. The second computer can be programmed with software whereby the encrypted original authentication data can be decrypted by a user having a key. The software then allows the user to prepare corresponding second authentication data from second image data of questionable authenticity. If the second authentication data is the same as the original authentication data, the questionable second image data is deemed to be an accurate copy of the original image data.

An advantage of the present invention is that it provides a method and apparatus for securing data while storing and transferring otherwise unsecured.

A further advantage of the present invention is that it provides a method and apparatus for securing the chain of custody of digital data that would otherwise provide only unsecured image data.

Another advantage of the present invention is that by putting the security function in a removable storage device, the storage can be customized for a particular user with no need for special hardware on the camera or the PC, enabling the retrofitting of otherwise unacceptable cameras with appropriate security functionality.

Another advantage of the present invention is that it provides a predefined filter for securing specific files while leaving others unsecured.

Another advantage of the present invention is that it provides a predefined filter for securing specific portions of a given file while retaining the remaining portion unsecured.

A still further advantage of the method and apparatus of the present invention is that the processing provided is undetected i.e. transparent to the camera and to the computer, and as a result the method and apparatus can be applied to any digital camera, and also to a variety of other devices that utilize peer to host and peer to peer communication and/or removable storage.

DESCRIPTION OF THE PREFERRED EMBODIMENT

Figure 1:
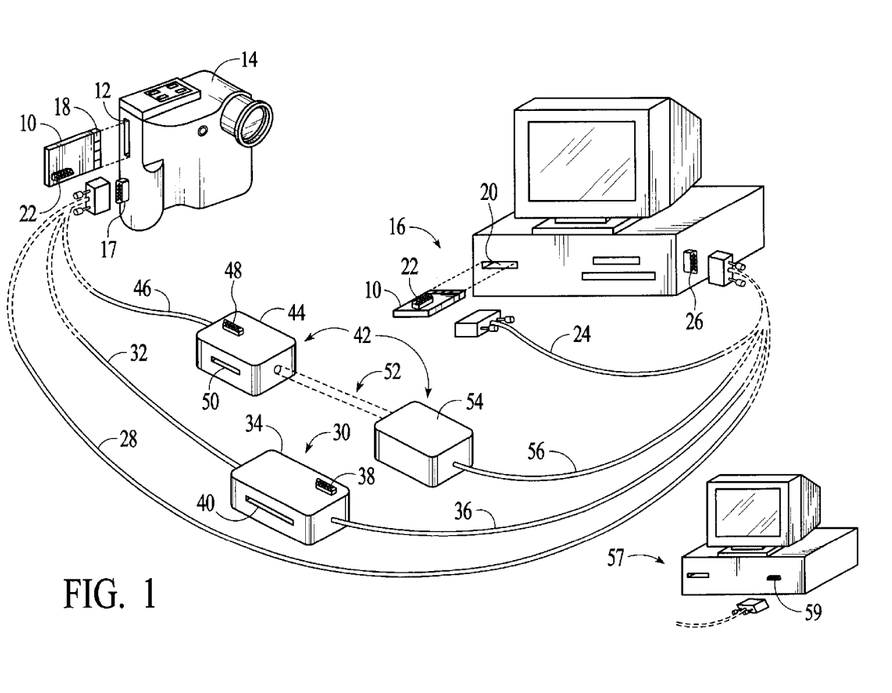
FIG. 1 is a perspective view illustrating the use of the present invention to transfer data.

Referring now to FIG. 1 of the drawing, the method and apparatus of the present invention is illustrated. The preferred embodiment includes a secure storage device electronic digital signal processing apparatus, the referred embodiment of the secure storage device being a card 10, and configured to physically engage with a PCMCIA card slot 12 of a prior art digital camera 14. Although the camera 14 shown is typical in appearance to a still camera, the method and apparatus also applies to motion picture/video cameras.

According to the method of the present invention, the device 10 is initially programmed to receive data from a digital camera, without the need of a password/key from the camera, and to perform the required processes to secure the data from the camera 14. The initial programming of device 10 can be either fixed, one time programming of a ROM, and/or it can be a program downloaded by a user from a PC such as PC 16. This programming data, as well as additional data, can be loaded into device 10 through the PCMCIA terminal 18 from a corresponding PCMCIA slot 20 in the PC 16. Alternatively, the device 10 can receive data through an input port 22 connected for example with a cable assembly 24 to a compatible port 26 of PC 16. The device 10 can be programmed to perform any of a variety of processes to secure the data, including encryption of image data, and/or creation of encrypted image authentication data, or watermarking, etc.

In operation, the programmed device 10 is inserted in slot 12 of the still/video camera 14. When the device 10 receives data from the camera 14, it performs the programmed operations and stores the data. The device 10 is then removed from the camera 14 and inserted into the PCMCIA slot 20 of the computer 16. The device 10 is configured so that the PC 16 recognizes the device 10 as a regular storage device with readable files on the file system level without the need for presenting a password. The secure data is then transferred from the device 10 to the computer 16. In order for a user to view encrypted data, the computer 16 must be programmed to decrypt the data, generally in response to entry of a password.

Referring again to FIG. 1, according to the prior art, a digital camera 14 is connected to a computer 16 by way of a direct cable connection indicated by line 28 making a direct cable connection from the camera connector 29 to the PC connector 26. In this manner, unsecured camera data is directly transferred to a PC 16. An unauthorized user could then easily modify the data with the PC 16. The method and apparatus of the present invention solves this problem by first transferring the camera data to the secure storage device 10, which automatically secures the data. Two alternate embodiments of the present invention are also shown in FIG. 1.

A first alternate embodiment of the secure storage device includes a secure data transfer device 30 having an input cable assembly 32 for making a connection from the camera 14 connector 17 to a security device 34. The security device 34 performs the same or similar operations as those discussed in reference to device 10 for securing the image data, and outputs the data to the PC 16 through an output cable 36, which in operation is connected to connector 26 of PC 16. The device 34 is programmable, and can receive additional data in the same manner as device 10, by connection to a computer through either cable assembly 32 or 36, or alternatively through a connector 38, or by way of a PCMCIA card through a PCMCIA card slot 40.

The second alternative embodiment, also shown in FIG. 1, includes a wireless secure data transfer device 42, including a security device 44 that can be connected to a camera 14 by way of a cable assembly 46. The device 42 is programmable and receives additional data either from a PC through cable assembly 46 or connector 48, or by way of a PCMCIA card through slot 50. The device 44 includes a transceiver having a modulated infrared transmitter portion for generation of an infrared signal 52 for transmission of data to an infrared transceiver 54 which receives and demodulates the signal, and outputs the data to the computer 16 through a cable assembly 56. The transceiver properties of device 44 and transceiver 54 in addition allow for programming and other data to flow from PC 16 to device 44 through the wireless infrared connection.

In all of the above embodiments, the devices 10, 30 and 42 present a standard interface to the camera 14 and PC 16. From the camera's point of view, the communication appears as if a direct connection is made to the PC. Similarly, the PC observes a connection that appears to be directly to the camera. This feature of transparency of the devices 10, 30, 42 allows the apparatus and method of the present invention to apply to any digital camera and any PC that is programmed to receive digital camera data. The security is performed inside the device 10, 30, 42 and has no effect on the camera or PC.

The computer 16 of FIG. 1 represents a destination to which the camera data is being transferred. Although a PC is illustrated, this destination can be any computerized network, system, etc. capable of receiving the data. FIG. 1 also shows a second destination 57 with a data input connection 59. The second destination 57 is shown to illustrate an important alternate embodiment of the method of the present invention, wherein a user can hook the output of device 10, 30, or 42 to a first destination 16 to download a first set of data, for example encrypted authentication data, and then to the second destination 57 to download a second set of data, which for example could be authenticated image data.

Figure 2:
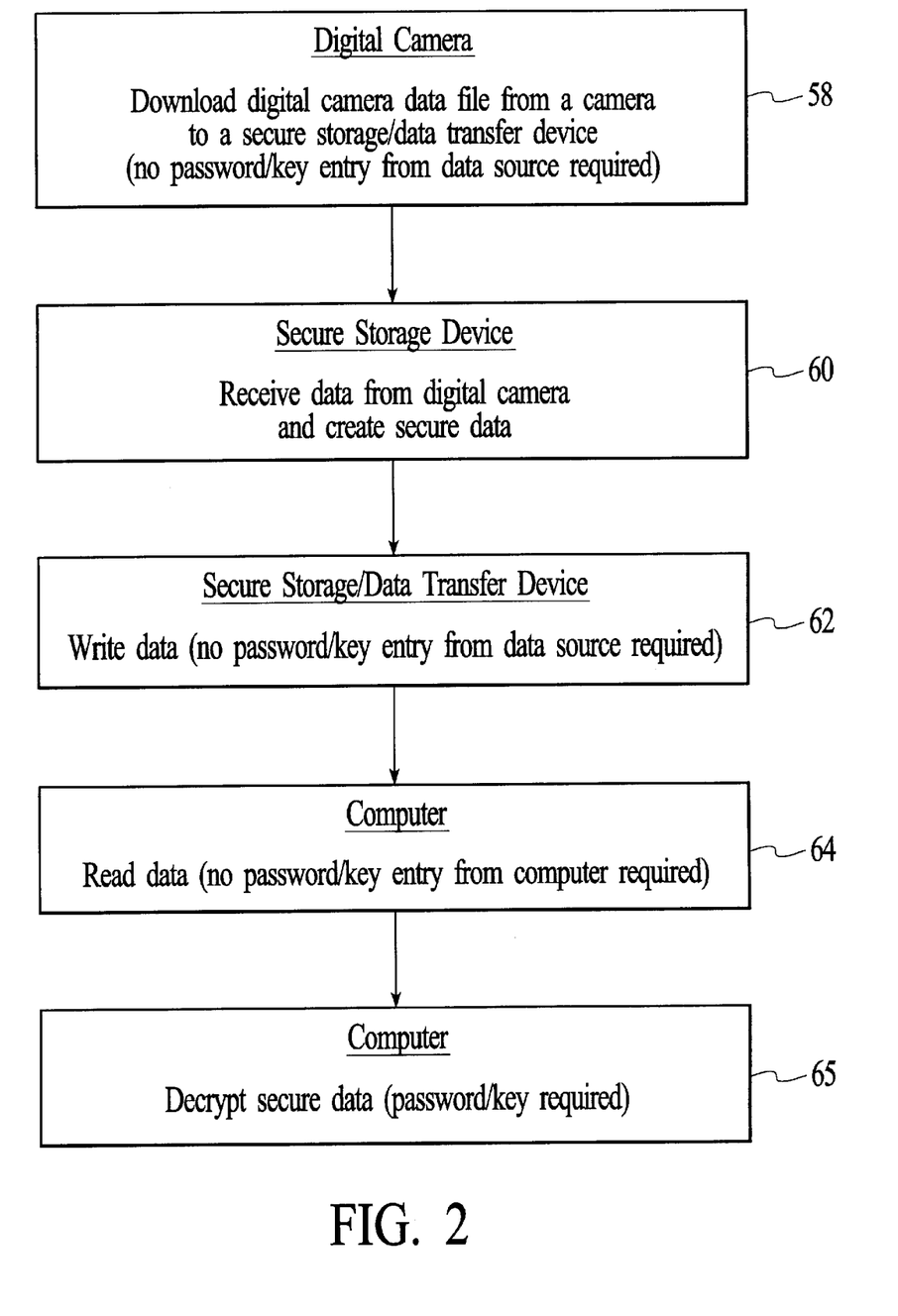
FIG. 2 is a block diagram showing the method steps of secure data transfer.

FIG. 2 shows the basic process in block form. Block 58 includes the operation of a digital camera writing original digital camera data to a secure storage device without the need for presenting a password. This data is received by the storage device and secured (block 60), a process requiring a pre programmed key. The storage device then writes the secured data (block 62), again without requiring the receipt of a password, which is read by the computer (block 64). In this operation it is assumed that the user has loaded the required operating software into the computer. The user must then present a password/key to the computer in order to decrypt the secure data or perform an authentication operation (block 65).

It is important to point out here that the storage device described herein presents an external behavior/interface to the camera that appears to the camera to be the same as the prior art devices into which the camera is designed to download data. A major distinction between the prior art storage devices designed and used for digital cameras and the secure device of the present invention is that the disclosed device upon receiving data/information, performs operations to secure the data. This is done without requiring a password or key from the camera, which is an important feature of the present invention. Similarly, a computer can receive the secure data from the storage device without presenting a password/key. Once the secure data is loaded in the computer, a key must be presented in order to decrypt the secure data.

The advantage of this method is that no special programming or apparatus, other than the secure storage device, is required in order to securely transfer data from a conventional prior art digital camera to a computer.

The preferred external physical configuration of the secure storage device is that of a standard PCMCIA card, for example device 10 of FIG. 1 without the connection 22. In this configuration, neither a user nor the camera nor a computer can distinguish the secure storage device from a standard PCMCIA card. The device accepts data from a camera, and sends data to a computer using standard protocol as if the device is a regular PCMCIA card. The only difference is that the data is secured through any of various means which will be described in the following specification, such as encryption, authentication, etc. A user's only clue concerning the unique nature of this device is that encrypted data loaded into a computer from the device will not be intelligible until decrypted, a process requiring special software in the computer, including a password and/or key. A point of novelty illustrated in FIG. 2 is that no password or key is required either to download data from the camera to the device, or from the device to a computer, as indicated in blocks 58, 62 and 64. This method allows maximum security of data, while allowing use of a standard digital camera and computer for all phases except the final step (block 65), wherein the user must load appropriate software with a key into the computer for decryption of the encrypted data.

Other physical embodiments of the secure storage device are as illustrated and discussed in reference to FIG. 1. In addition, the device 10 can alternatively be a SSFDC (Smart Media) card, or flash card, etc.

Figure 3:
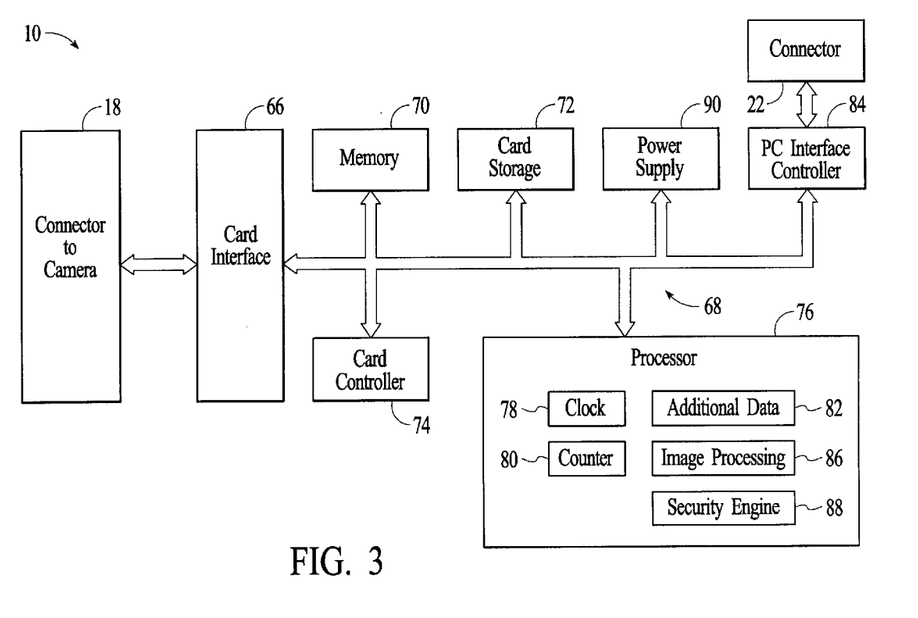
FIG. 3 is a block diagram of a secure storage device.

FIG. 3 illustrates typical circuit blocks required within the device 10. The connector/connection 18 passes data from the camera 14 to a card interface 66 providing the necessary protocol for communication with the camera. Bus line 68 interconnects the various circuit blocks as required. There is a memory 70, which can include a EEPROM and/or a ROM and RAM as required in a particular design. The card storage block 72 indicates the use of a floppy disk, or mini disk, etc. for retaining the data for storage and transfer to a computer. Card controller 74 performs the standard/usual card operations, with additional processes accomplished by processor 76, which preferably includes a clock 78, counter 80, and facility for receiving additional data (block 82) from a PC through either of connectors 18 or optionally through PC interface controller 84 from connector 22. The processor also performs image processing activity 86 including security process 88. The power supply 90 is included as optional in design, including a clock, for example, or where power cannot be obtained from the camera and computer.

Figure 4:
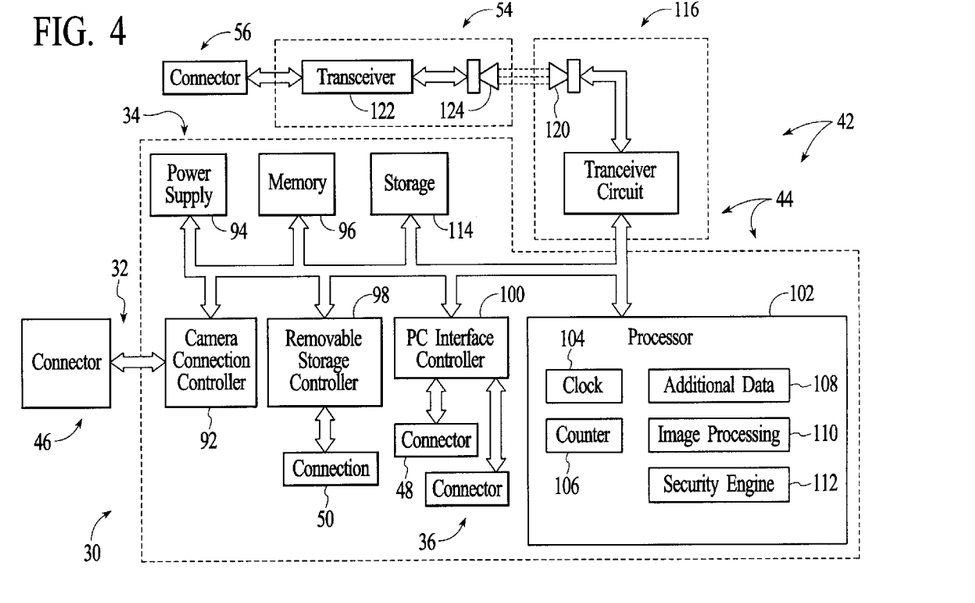
FIG. 4 is a block diagram of a secure data transfer device.

FIG. 4 illustrates typical circuit block functions for devices 30 and 42. Device 30 includes security device 34 and cable connector assemblies 32 to a camera and 36 to a computer, Device 42 includes the cable connector assemblies 46 and 56, a separate transceiver 54 and security device 44 which includes the circuitry in security device 34 with transceiver circuitry 116 added, The device 34 circuitry includes a camera connection controller 92, power supply 94, memory 96, a removable storage controller 98 providing interface to card connection 50, a PC interface controller 100 providing interface to cable connector assemblies 48 and 36, a processor 102 with a clock 104, counter 106, additional data 108, image processing 110 and a security engine 112. The storage 114 is optional for the data transfer devices 30 and 42, and is for storing the data to be transferred from a camera to a computer, and can be a floppy disk, mini disk, etc. Since the use of the devices 30 and 42 preferably involves connecting to both the camera and destination at the same time, data can normally be transferred quickly enough so that memory 96 can provide adequate storage/buffering. If applications require longer storage, the optional storage 114 can be included in the design.

Figure 5:
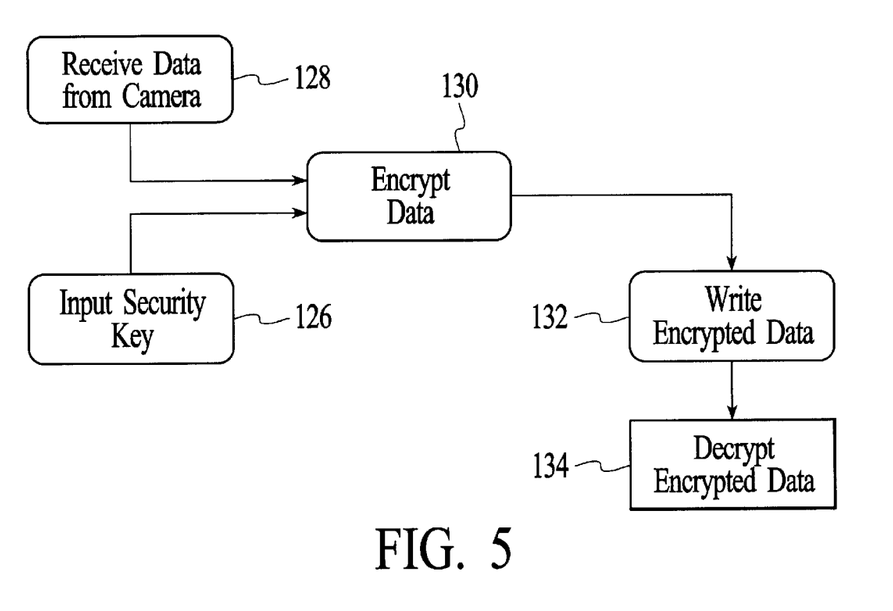
FIG. 5 illustrates the transfer of secure data by way of data encryption.

FIG. 5 illustrates the processes of the secure storage devices 10,30,42 for encryption of original digital camera data. According to the process, the storage device is initially programmed with a security key (block 126). This operation is done as an initial set-up of the device, prior to it's normal usage. This key programming can be a permanent setting, or it can be programmable. With the devices device 10, 30, or 42 ready for normal use, it is then connected to a camera and receives original digital camera data (block 128). The device then encrypts the original digital camera data (block 130). Following this, the device is removed from the camera and connected to a computer loaded with compatible software. The device 10, 30, 42 then writes the data to a computer (block 132). A user knowing the security key can then operate the computer to decrypt the encrypted data (block 134). As explained in reference to the method indicated in FIG. 2, the device 10, 30, 42 does not require receipt of a password/key to receive data from a camera, or to download data to a computer. The key is used in the encryption process and is only a factor when a user desires to view the original data through use of the computer.

Figure 6:
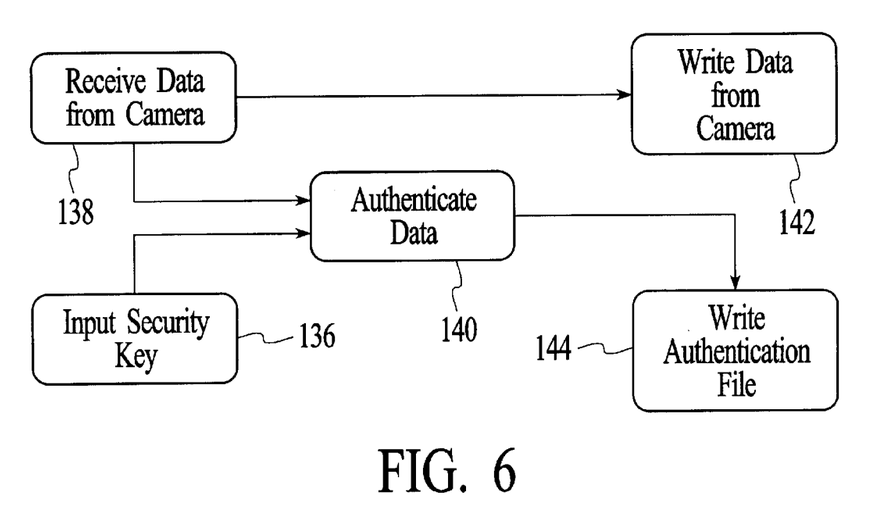
FIG. 6 illustrates the storage device for secure data transfer through creation of authentication data.

A secure storage device can also be programmed to create authentication data. This is illustrated in FIG. 6. As in the case of FIG. 5, the storage device is initially programmed with a security key (block 136) prior to use of the device. The device is then connected to a camera to receive original camera data (block 138). Authentication data is then created within the storage device from the original camera data and then encrypted (block 140).

Figure 7:
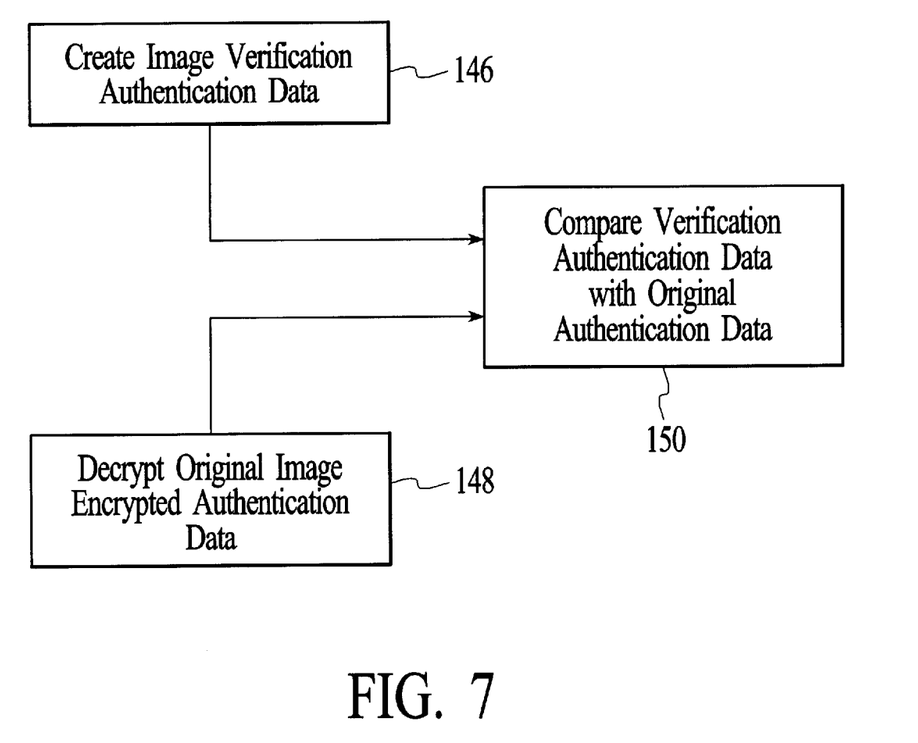
FIG. 7 illustrates the process of a host computer for verifying image data authenticity through use of authentication data.

Any person can then download the camera data, i.e. cause the storage device to write the camera data (block 142), and authentication data/file (block 144) to a computer. This completes the function of the storage device. The user can then proceed to use the computer as indicated in FIG. 7 to verify the authenticity of a set of questionable data. The user first uses appropriate software and the key to create verification authentication data from the questionable image data file (block 146), and decrypts the encrypted original authentication data (block 148). The two sets of data are then compared (block 150). If they are the same, the questionable image data is considered valid, i.e. an accurate replica of the original image data. If the two sets are different, the questionable data is confirmed to be different from the original.

Figure 8:
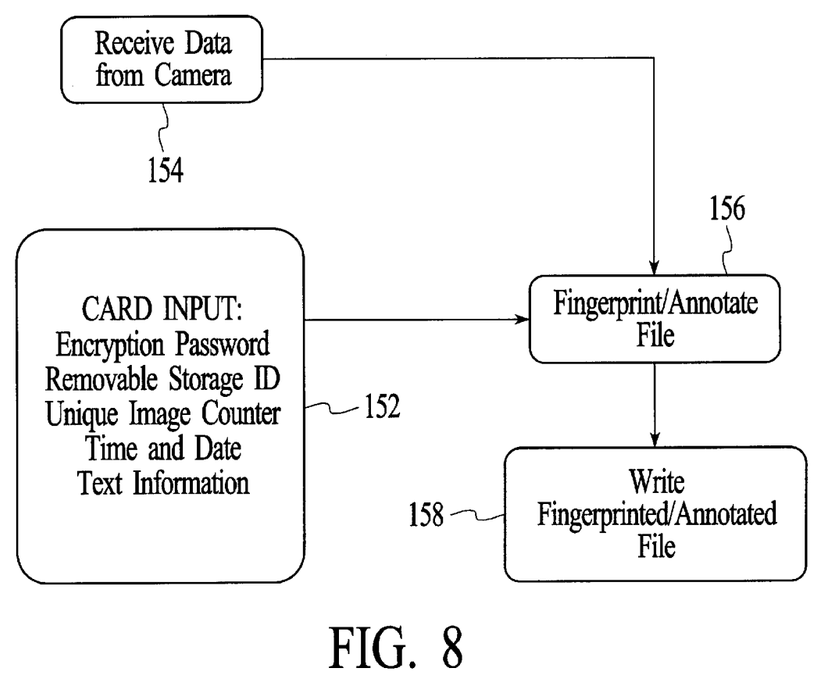
FIG. 8 shows a method of secure data transfer by way of fingerprinting with/or annotation.

FIG. 8 illustrates two similar processes called "fingerprinting" and "annotating". Fingerprinting is a process wherein additional information is visibly or invisibly inserted into the image data itself. Examples of additional information that can be added include the camera serial number, date and time, unique counter, image storage ID, and any textual information that is downloaded to the storage device prior to receiving the camera image data. The process of annotation is similar to fingerprinting, except that the information is placed in a non-image area such as the header, rather than in the image data. Referring to FIG. 8, the storage device is connected to a computer and the required data is inputted, i.e. downloaded (block 152). This can be done through connection 18 for a PCMCIA card configured device 10, or through connector 22 of the alternative device 10. Device 42 is configured as indicated in FIG. 4 to receive data through port 48 or through cable assembly 46 or through cable assembly 50 from a PC, or through port 56 from a PC, or through port 50 from a PCMCIA card. Similarly, device 30 is configured to receive data alternatively through cable assembly 32 or 36, or connector 38 from a PC, or through port 40 from a PCMCIA card. The storage device is then connected to a camera and receives camera data, i.e. camera data is downloaded (block 154). The device then performs programmed processes of either fingerprinting the data or annotating the data file (block 156) depending on the specific programming of the storage device. The storage device is then removed from the camera, connected to a computer, and the data is written, i.e. downloaded to the computer (block 158). As explained above, this is all done without the presentation of a password or key from the camera or computer. Once the data is in a computer, however, the original data or authentication requires submission of a password/key.

Figure 9:
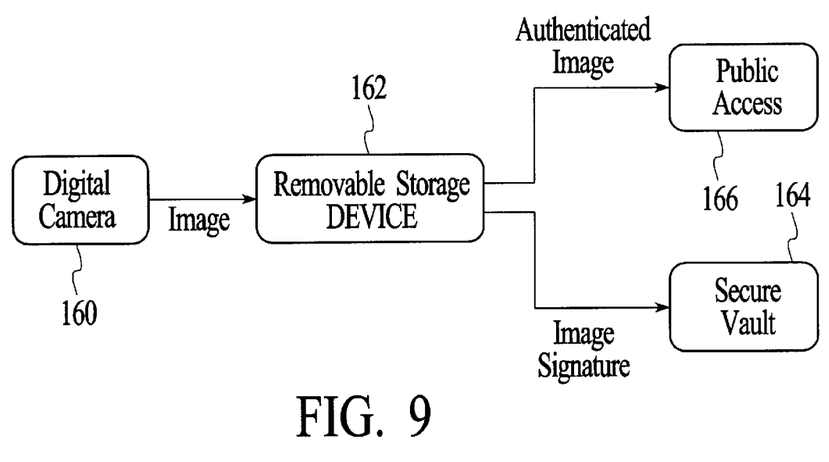
FIG. 9 illustrates the sending of secured data from a secure storage device to a first location, and public data to a second location.

In some cases, it is preferred to keep a signature file or authentication file in a secure, private location, and allow public access only to an authenticated image. These processes are illustrated in FIG. 9, wherein image data is downloaded from a camera 160 to a secure storage device 162, which performs the required security functions. The device 162 then downloads the image security data to secure location 164, and an authenticated image to public access 166.

An alternate embodiment of the secure storage device of the present invention includes the secure storage devices as described above as separate and distinct entities from the camera, for receiving digital data from any compatible source. The description of features and operation are the same as described above with the exception that the term "camera" is replaced with the term "source". For example, in FIG. 9 "Digital Camera" would read "Digital Source", and "camera" would read "source", meaning a source of digital data to be operated on and/or stored by the secure storage device. In these alternate embodiments, the operation of encrypting, storing, annotating, fingerprinting, etc. are performed by the secure storage devices 10, 30, 42 on digital data from any compatible source. Typical sources include computing machines with removable storage such as hand held PCs, notebooks or palm computers. These types of devices are usually used outside of the secure office environment, and therefore are more susceptible to ending up in the wrong hands. In such cases, files created on the road will be automatically secured. The office based desktop computer will have the software that with the corresponding password will be able to decrypt the data.

A still further embodiment of the present invention will now be presented wherein the secure storage devices as described above for use with either a digital camera, or with other sources of digital data, are programmed to selectively secure i.e., encrypt, annotate, fingerprint, etc. prescribed portions of data while leaving other portions unaltered. This embodiment is presented to meet the need where it is preferable or required to secure one or more selected files while leaving the remaining files unsecured.

An example of a "need" is when a digital camera user wants to encrypt image files but needs to maintain unaltered control files that the camera may require for operation.

Another example of such a requirement is the need for a digital camera to read header information, such as the image acquisition data and specifically the thumbnail, while encrypting the image itself.

A still further example of such a requirement is the need for a PC to read the information of a spread sheet file such as the name of the author and date of creation, while encrypting the numerical data itself.

Implementation of this embodiment is achieved by programming the processor 102 (FIG. 4), or 76 (FIG. 3) to require a particular code included with a data file in order to respond by securing the file. The code includes data to direct the processor to perform one or more of the security operations (encryption, authentication, fingerprinting, etc.) on the file. The processor programmed to perform a particular type of securing operation, such as encryption, will be termed a "filter", and the process of selectively securing termed "filtering". A computerized host device receiving secure data from the apparatus 30 or 42 perceives the interface to the secure storage apparatus 40, 50 as if it were an ordinary, standard camera data interface. To the host device, the connectors 48 and 50 appear as standard connectors, and the interfaces in the controllers as defined in blocks 98 and 100 are industry standard interfaces. In this way, the host device (where the secured card is mounted), need have no knowledge of the specific security nature of the secure storage device.

Figure 10:
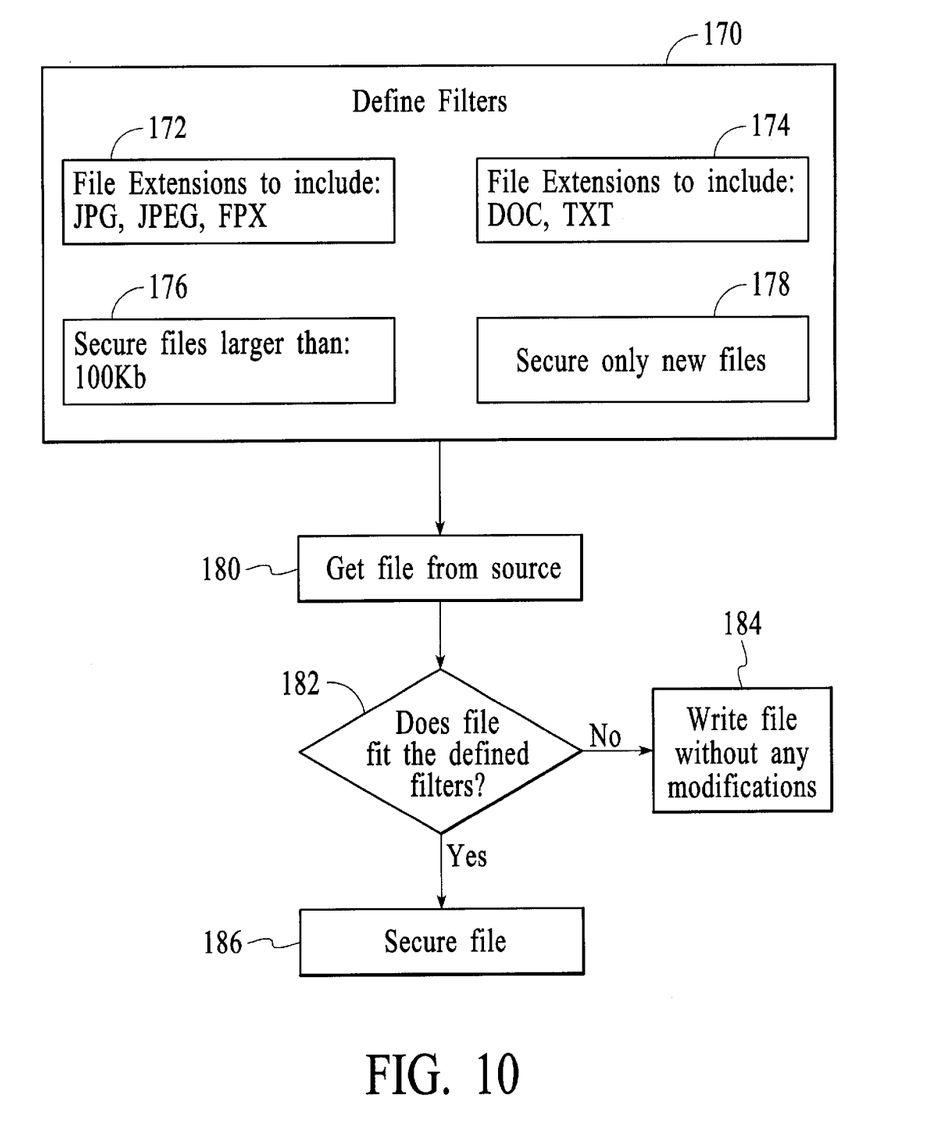
FIG. 10 is a flowchart wherein a filter can be set to determine which files will be secured and which will not be securred.

The process of filtering is more clearly described in reference to FIG. 10. Initially, the processor must be programmed with the required filters. This is indicated in block 170, showing four different types of possible filters. Filter 172 causes files with certain extensions, otherwise referred to as file postfix, to be filtered. Filter 174 causes all files to be secured except those with extensions of DOC and TXT. The notion of file extensions can be expanded to file types, such as binary or more specific file formats. Filter 176 causes files larger than 100 kb to be secured, and filter 178 secures only new files.

Assuming the secure storage device has been programmed appropriately, the operation proceeds as follows. As indicated by block 180, the device input, such as terminal 18 of the card 10, or line 32 of the device 30, is connected to a source of data files, and a file is written into the device 10, 30, 42.

The device processor then determines if any of the codes specifying filtering are present in the data file. This step is indicated by block 182. If the file does not include any of the codes required to activate filtering, the file is stored, and subsequently written to a computer without modification (block 184). If the file contains code corresponding to a filter, the device processor proceeds to perform the process of securing indicated by the code (block 186).

Figure 11:
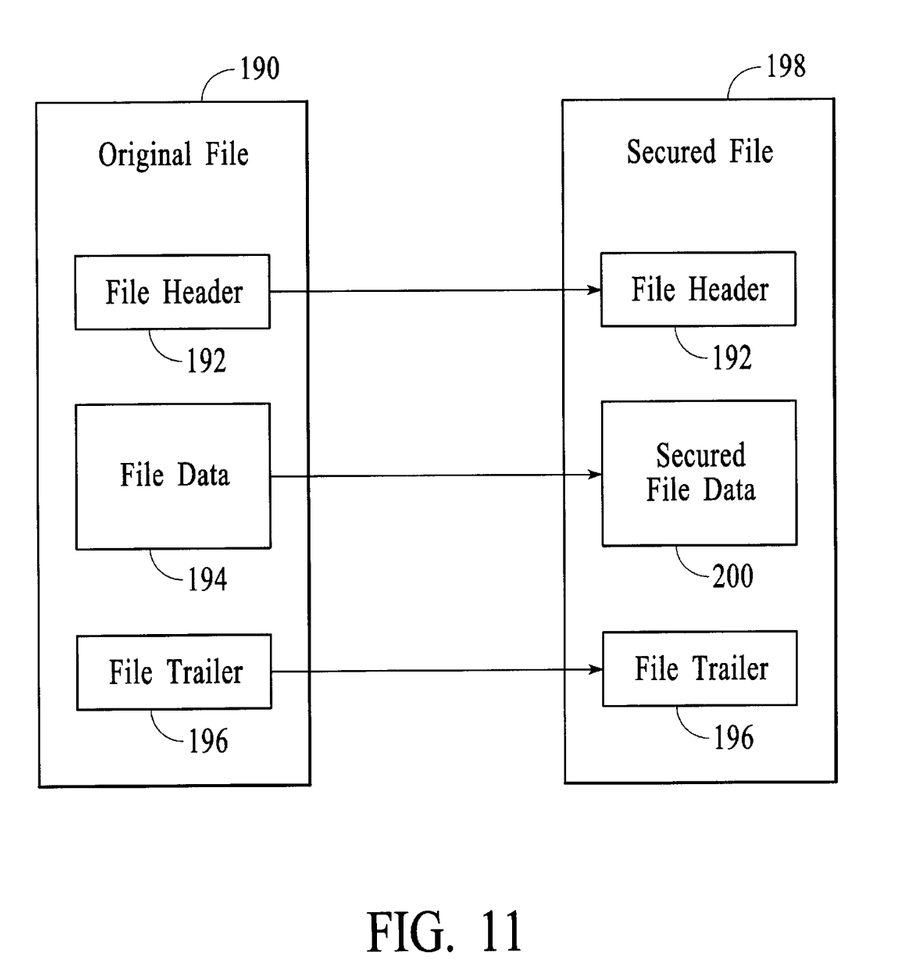
FIG. 11 illutrates an example where certain regions of a file will be secured while others will not.

FIG. 11 illustrates an alternate embodiment of the filtering process wherein a selected portion or portions of a file are secured and the remaining portions remain unsecured. An example of this need is in the case of a compressed image file in what is known as the EXIF format. In this case, it may be necessary to maintain header information in the unsecured state, while the file image data is secured. FIG. 11 shows a standard original file format 190, such as EXIF, wherein portions such as a header 192 and a trailer 196 are to be written into the device unsecured, while the data 194 is to be written in a secured form. The figure shows a secured file 198 with the file header 192 and trailer 196 written in unaltered form, and the file data 194 altered and written as secured file 200. In this case, a digital camera or an imaging application will still detect the file type EXIF and provide preliminary information such as thumbnail viewing while inhibiting the use of the full data. Of course, filtering the files selectively can be done to an even finer degree. As an example, in FIG. 11 the header 192 may include multiple image tags. The filtering process may selectively secure specific tags while keeping others in their original form.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of securing data in a transparent manner in a removable secure storage device comprising:
    (a) writing source data from a digital data source to a removable secure storage device, wherein said removable secure storage device
        (i) includes a controller, a processor, a memory, and an interface to the digital data source within the removable secure storage device; and
        (ii) said removable secure storage device is responsive to the same protocol in a transparent manner to the host device as an unsecured device having an industry standard form factor, read-write interface, file system configuration, and hardware connectivity, and as a result the removable secure storage device is transparent to said digital data source, whereby said source responds to said removable secure storage device as if it were an unsecured storage device; and
    (b) creating secure source data within said removable secure storage device by performing digital processing related to said source data within said removable secure storage device.

2. A method as recited in claim 1 further comprising:
    (a) loading the secure device with additional data; and
    (b) storing the additional data in the secure device.

3. A method as recited in claim 2 wherein said additional data functions as a filter that causes said secure device to selectively secure a portion of said unsecured source data.

4. A method as recited in claim 3 wherein said selected portion is a data file.

5. A method as recited in claim 4 wherein said filter causes a specific file format of said data file to be secured.

6. A method as recited in claim 4 wherein said filter causes a file of a specified creation status to be secured.

7. A method as recited in claim 4 wherein said filter causes a file of a specified file size range to be secured.

8. A method as recited in claim 4 wherein said filter selects which portions of said file to be secured.

9. A method as recited in claim 8 wherein said portion includes a header data and a trailer data of said file.

10. A removable secure storage device comprising:
    (a) an interface for receiving unsecured source digital data from a source device;
    (b) a processor for creating secure data from said unsecured source data;
    (c) a memory for storing data; and
    (d) a controller for controlling functions of the removable secure storage device,
    wherein said removable secure storage device is transparently responsive to the same protocol as an unsecured device having an industry standard form factor, read-write interface, file system configuration, and hardware connectivity, and as a result the removable secure storage device is transparent to said source device, whereby said source device responds to the removable secure storage device as if it were any standard peripheral storage device.

11. An apparatus as recited in claim 10 wherein said removable secure storage device is responsive to the same protocol and file system structure as an unsecured device.

12. An apparatus as recited in claim 10 further comprising means for securing a selected portion of said unsecured source data, based on a predefined filtering criteria.

* * * * *

UNITED STATES PATENT AND TRADEMARK OFFICE
CERTIFICATE OF CORRECTION

PATENT NO. : 6,587,949 B1  
APPLICATION NO. : 09/335219  
DATED : July 1, 2003  
INVENTOR(S) : Eran Steinberg Page 1 of 1

It is certified that error appears in the above-identified patent and that said Letters Patent is hereby corrected as shown below:

Column 10, line 1, "unsecured" should read --unsecure--

Column 10, line 7, "unsecured" should read --unsecure--

Column 10, line 40, "unsecured" should read --unsecure--

Column 10, line 49, "unsecured" should read --unsecure--

Signed and Sealed this

Thirtieth Day of September, 2008

JON W. DUDAS  
*Director of the United States Patent and Trademark Office*